United States Patent
Yasui et al.

(10) Patent No.: US 9,851,614 B2
(45) Date of Patent: Dec. 26, 2017

(54) ELECTROPHORETIC DEVICE, ELECTROPHORETIC DISPLAY APPARATUS, ELECTRONIC APPARATUS, AND METHOD OF MANUFACTURING ELECTROPHORETIC DEVICE

(71) Applicant: Sony Corporation, Tokyo (JP)

(72) Inventors: Atsuhito Yasui, Kanagawa (JP); Hiroyuki Yasukochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 30 days.

(21) Appl. No.: 13/890,574

(22) Filed: May 9, 2013

(65) Prior Publication Data
US 2013/0308175 A1    Nov. 21, 2013

(30) Foreign Application Priority Data

May 16, 2012  (JP) .................. 2012-112882

(51) Int. Cl.
| | |
|---|---|
| G02B 26/00 | (2006.01) |
| G09G 3/34 | (2006.01) |
| G03G 17/04 | (2006.01) |
| G02F 1/167 | (2006.01) |

(52) U.S. Cl.
CPC .......... *G02F 1/167* (2013.01); *G02F 2201/02* (2013.01)

(58) Field of Classification Search
CPC .... G02F 1/167; G02F 2001/1678; G02F 1/03; G02F 1/133; G02F 1/061; G02B 26/26; G02B 26/00; G02B 26/08

USPC ........ 359/296, 253–254, 245, 290–291, 298; 349/33; 345/49, 105, 107; 430/31–32
See application file for complete search history.

(56) References Cited

U.S. PATENT DOCUMENTS

| | | | |
|---|---|---|---|
| 2008/0151355 A1* | 6/2008 | Suwabe et al. ............... | 359/296 |
| 2008/0198443 A1* | 8/2008 | Yoshimura et al. .......... | 359/296 |
| 2011/0075249 A1* | 3/2011 | Murakami ..................... | 359/296 |
| 2011/0310465 A1* | 12/2011 | Takanashi et al. ........... | 359/296 |
| 2012/0099182 A1* | 4/2012 | Ogawa .......................... | 359/296 |
| 2014/0118640 A1* | 5/2014 | Chen ................. | G02F 1/133308 |
| | | | 349/12 |

FOREIGN PATENT DOCUMENTS

| | | |
|---|---|---|
| JP | 50-015115 A | 6/1973 |
| JP | 64-086116 A | 3/1989 |
| JP | 2003-526817 A | 9/2003 |
| JP | 2004-526210 A | 8/2004 |

\* cited by examiner

*Primary Examiner* — Dawayne A Pinkney
(74) *Attorney, Agent, or Firm* — Chip Law Group

(57) ABSTRACT

An electrophoretic device includes a fiber layer, an electrophoretic particle configured to migrate through a gap in the fiber layer, and a partition wall extended in a thickness direction of the fiber layer to separate the fiber layer into a plurality of migration cells. The partition wall includes a cured body of a curable resin, and the cured body includes a constriction part between both end portions of the fiber layer in the thickness direction.

14 Claims, 12 Drawing Sheets

ELECTROPHORETIC DEVICE, ELECTROPHORETIC DISPLAY APPARATUS, ELECTRONIC APPARATUS, AND METHOD OF MANUFACTURING ELECTROPHORETIC DEVICE

BACKGROUND

The present disclosure relates to an electrophoretic device including electrophoretic particles dispersed in a fiber layer, an electrophoretic display apparatus, an electronic apparatus, and a method of manufacturing an electrophoretic device.

In recent years, for mobile apparatuses such as a mobile phone terminal and a personal digital assistant, a display apparatus that displays images with higher quality is being demanded. For example, as a display apparatus of an electronic book terminal for reading, reflective display apparatuses and light-emitting display apparatuses have been proposed. Out of the reflective display apparatuses, a rapid-response electrophoretic display apparatus with low power consumption is expected as a display apparatus for an electronic book terminal.

Electrophoretic display apparatuses disclosed in Japanese Examined Patent Publication No. Sho 50-015115, Japanese Patent Translation Publication No. 2004-526210, Japanese Patent Application Laid-open No. Hei 1-86116, and Japanese Patent Translation Publication No. 2003-526817 cause charge particles of two types having different reflectances from each other to move in different directions by an electrical field. Colors for display which are represented by distributions of the electrophoretic particles of two types are changed depending on a direction or a size of the electrical field. In the electrophoretic display apparatuses disclosed in Japanese Patent Translation Publication No. 2004-526210 and Japanese Patent Application Laid-open No. Hei 1-86116, electrophoretic particles of two types and a solvent are encapsulated in a microcapsule. In the electrophoretic display apparatus disclosed in Japanese Patent Translation Publication No. 2003-526817, electrophoretic particles of two types and a solvent are filled in a microcup which has a lattice-shaped partition wall. With those structures, the aggregation, precipitation, and convection of the electrophoretic particles are suppressed, with the result that unevenness of an image displayed is suppressed.

SUMMARY

Incidentally, in the display apparatuses in which the microcapsule or the microcup is used, the partition wall of the microcapsule or the microcup is exposed to a display surface by an area to the same extent as the electrophoretic particles. Generally, the value of the reflectance of the partition wall is intermediate between the values of the reflectances of the electrophoretic particles of two types. The partition wall makes the display surface darker, with the result that a contrast in the electrophoretic display apparatus becomes lower.

As described above, in the electrophoretic display apparatuses, although various structures mentioned above have been proposed, the contrast in an image displayed is susceptible to improvement.

It is desirable to provide an electrophoretic device, an electrophoretic display apparatus, an electronic apparatus, and a method of manufacturing an electrophoretic device which are capable of increasing the contrast.

According to an embodiment of the present disclosure, there is provided an electrophoretic device including a fiber layer, an electrophoretic particle configured to migrate through a gap in the fiber layer, and a partition wall extended in a thickness direction of the fiber layer to separate the fiber layer into a plurality of migration cells. The partition wall includes a cured body of a curable resin, and the cured body includes a constriction part between both end portions of the fiber layer in the thickness direction.

According to another embodiment of the present disclosure, there is provided a method of manufacturing an electrophoretic device including filling a gap in a stacked fiber that forms a fiber layer with a curable resin, curing the curable resin from both sides of the fiber layer in the thickness direction and forming, in the fiber layer, a partition wall including a constriction part between both end portions in the thickness direction, and causing an electrophoretic particle to be included in the gap in the fiber.

In the electrophoretic device that causes the electrophoretic particle to migrate in the gap in the fiber layer, the width of the partition wall for separating the fiber layer into the plurality of migration cells affects the contrast of an image of the electrophoretic device and the contrast of an image of the electrophoretic display apparatus provided with the electrophoretic device. That is, the larger the width of the partition wall is, the smaller a display area where the optical characteristic changes due to the electrophoretic particle, that is, an aperture ratio becomes. Thus, the optical characteristics such as scatter and refraction of light on the entire display surface are deteriorated. As a result, the contrast on the display surface is deteriorated.

By uniformly thinning the width of the partition wall, the deterioration of the contrast can be suppressed, but in this case, a mechanical strength necessary for the partition wall may be maintained. In particular, the front and back surfaces of the fiber layer which are the both end portions in the thickness direction of the fiber layer are portions susceptible to an external force by stacking another layer, for example. Accordingly, a larger mechanical strength is necessary as compared to the inside of the fiber layer.

In this point, in the electrophoretic device according to the embodiment of the present disclosure, the constriction part is provided between the both end portions of the partition wall in the thickness direction of the fiber layer. With this structure, it is possible to improve the optical characteristics of the fiber layer inside the migration cells while maintaining the mechanical strength necessary for the partition wall. Thus, it is possible to increase the contrast in the electrophoretic device.

By the method of manufacturing the electrophoretic device according to the embodiment of the present disclosure, the resin is cured from the both sides in the thickness direction in the fiber layer. Therefore, it is possible to form the partition wall that penetrates the fiber layer, even if the density of the fiber in the fiber layer is high to such an extent that the curing of the resin from one side in the thickness direction in the fiber layer does not reach the other side in the thickness direction in the fiber layer.

The density of the fiber that forms the fiber layer can be increased, so the optical characteristics held by the fiber can be increased in the fiber layer, with the result that contrast in the electrophoretic device can be increased.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of an electrophoretic device, an electrophoretic display apparatus, an electronic apparatus, and a method of manufacturing an electrophoretic device in the present disclosure will be described.

(Structure of Electrophoretic Display Apparatus)

Figure 1:
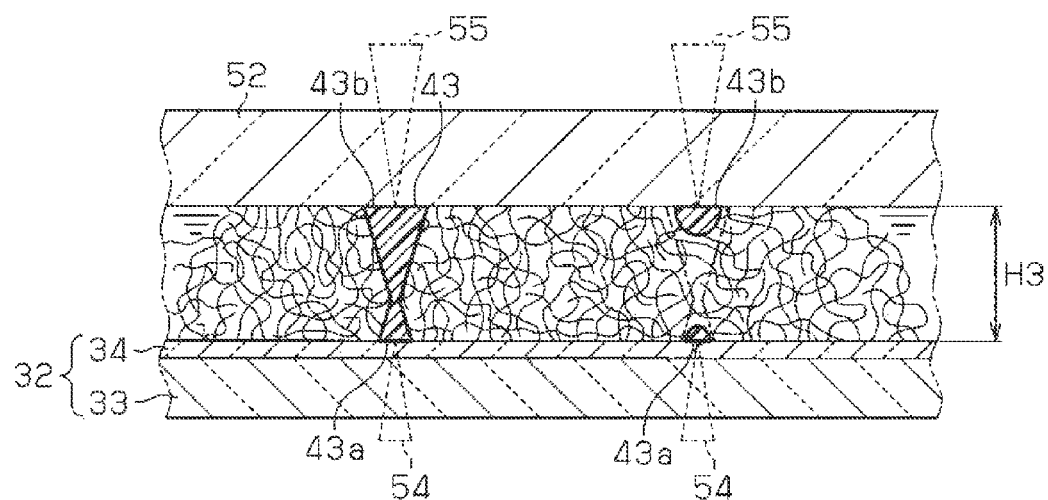
FIG. 1 is a cross-sectional view of an electrophoretic display apparatus according to an embodiment of the present disclosure.

As shown in FIG. 1, an electrophoretic display apparatus 10 is provided with an electrophoretic device 30 laminated on a substrate 20. The substrate 20 is a laminated body constituted of a support member 21 and a TFT layer 22 laminated on an upper surface of the support member 21. The electrophoretic device 30 is a laminated body constituted of an opposed layer 31 bonded to the TFT layer 22, a translucent layer 32 that faces the opposed layer 31, and a fiber layer 40 sandwiched between the opposed layer 31 and the translucent layer 32.

The support member 21 is a substrate with a mechanical strength which supports the components of the electrophoretic display apparatus 10, and the support member may be a translucent substrate that allows light to pass therethrough or a reflective substrate that reflects light. Further, the support member 21 may be a substrate having flexibility or a substrate with no flexibility. Whether the support member 21 has the translucency or the flexibility is appropriately selected in accordance with a use purpose of the electrophoretic display apparatus 10.

Examples of a material of the support member 21 include an inorganic material such as stainless, silicon, silicon oxide, silicon nitride, aluminum oxide, aluminum, nickel, and stainless. Further, for the support member 21, a resin material such as polycarbonate, polyethylene terephthalate, polyethylene naphthalate, and polyether ether ketone is used. It should be noted that the support material 21 may be a single-layer structure or a multilayer structure. A plurality of layers that form the multilayer structure may be formed of the same material or different materials from each layer.

The TFT layer 22 is a multilayer structure for driving the electrophoretic display apparatus 10, and the TFT layer may be a layer directly formed on the support member 21 or a layer bonded to the support member 21. The TFT layer 22 is provided with a plurality of thin film transistors that are drive devices for electrophorese the electrophoretic particles, an insulating layer 24 that covers the thin film transistors 23, and a plurality of pixel electrodes 25 that are connected to the thin film transistors 23 with the insulating layer 24 intervened therebetween. In the example shown in the figure, the thin film transistors 23 are formed on the support member 21.

The thin film transistor 23 may be an inorganic transistor in which an inorganic semiconductor such as amorphous silicon and polysilicon is used for an active layer or may be an organic transistor in which an organic semiconductor layer of polythiophene, pentacene or the like is used for an active layer. The pixel electrode 25 is formed of a metal oxide such as gold, silver, copper, aluminum, an aluminum alloy, and an indium tin oxide. The pixel electrode 25 may be a translucent electrode that allows light to pass therethrough or a reflective electrode that reflects light. Whether the pixel electrode 25 has translucency or not is appropriately determined in accordance with a use purpose of the electrophoretic display apparatus 10 as in the case of the support member 21.

The opposed layer 31 is a film structure that protects the pixel electrodes 25 against a mechanical contact or chemical erosion and is bonded to an upper surface of the TFT layer 22. Further, the opposed layer 31 has a sealing property such that the electrophoretic particles and a liquid contained in the fiber layer 40 are sealed in the fiber layer 40 and is bonded to a lower surface of the fiber layer 40. For example, the opposed layer 31 may be a thin film laminated on the TFT layer 22 or a film member that is bonded to the fiber layer 40.

The opposed layer 31 is formed of a resin material such as a phenol resin, an epoxy resin, and a polyimide resin. Further, the opposed layer 31 is formed of an inorganic material such as a silicon oxide, a silicon nitride, and silicon oxynitride. It should be noted that the opposed layer 31 may have a single-layer structure or a multilayer structure. A plurality of layers that form the multilayer structure may be formed of the same material or different materials from each layer.

The translucent layer 32 is a sheet member having translucency such that light from the outside of the electrophoretic display apparatus 10 is allowed to reach the fiber layer 40 and a sealing property such that the electrophoretic particles and a liquid contained in the fiber layer 40 are sealed in the fiber layer 40, and is bonded to the upper surface of the fiber layer 40. In the translucent layer 32, on an entire lower surface of an insulating sheet 33 that allows light to pass therethrough, a transparent electrode 34 that forms an electrical field between the pixel electrodes 25 and the transparent electrode 34 is laminated.

Examples of a material of the insulating sheet 33 include a silicon oxide, polycarbonate, polyethylene terephthalate, polyethylene naphthalate, polyether ether ketone, or the like. The transparent electrode 34 is made of a conductive material having translucency such as an indium tin oxide, an antimony tin oxide, a fluorine-added tin oxide, and an aluminum-added zinc oxide.

Figure 2:
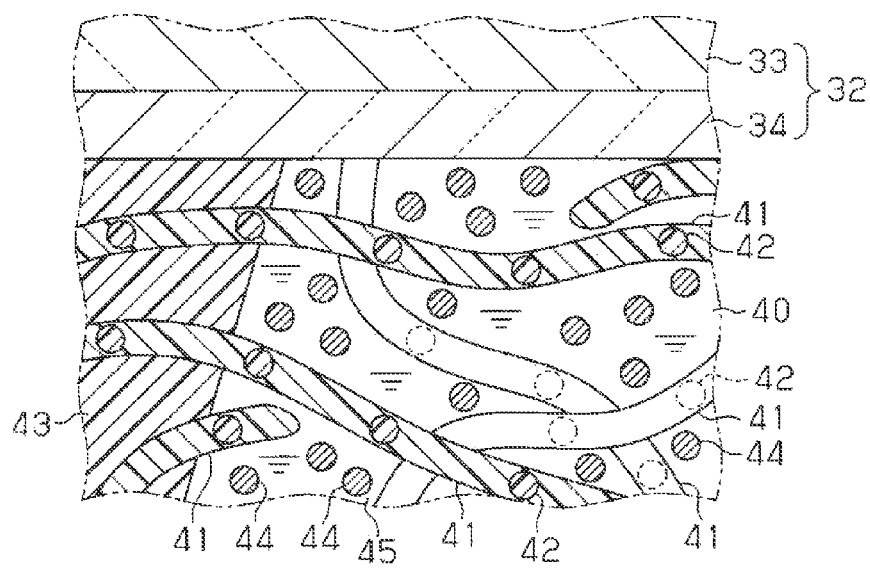
FIG. 2 is an enlarged cross-sectional view of the part A of FIG. 1.

As shown in FIG. 2, the fiber layer 40 is a structure including fibers 41 stacked and is sandwiched between the opposed layer 31 and the translucent layer 32. The fiber layer 40 may be a structure in which one fiber 41 is folded or a structure in which a large number of fibers 41 are overlapped. Further, the fiber layer 40 may have a multilayer form in which layers having a large number of fibers 41 disposed with gaps are regularly overlapped or may have a porous form in which a large number of fibers 41 are irregularly disposed. In the fiber layer 40, a partition wall 43 that penetrates the fiber layer 40 in a thickness direction is formed. The thickness direction of the fiber layer 40 is set as a direction in which a plurality of layers including the fiber layer 40 are stacked. For example, in the thickness direction, the fiber layer 40 is stacked on the translucent layer, and the opposed layer 31 is stacked on the fiber layer 40. By separating the fiber layer 40 into migration cells, namely cells C (see, FIG. 4), for the electrophoretic particles 44, the partition wall 43 partitions the fiber layers 40 into the cells C. In the partition wall 43, a part of the fiber 41 is buried. FIG. 2 shows the fibers 41 including a part inside the partition wall which is buried in the partition wall 43 and a part outside the partition wall which is disposed in the migration cell. In a part (cell C in FIG. 4) obtained by removing the fibers 41 and the partition wall 43 from the fiber layer 40, a dispersion medium 45 which is an insulating liquid is filled. In the dispersion medium 45, the electrophoretic particles 44 that electrophorese in the gaps between the fibers 41 are dispersed. In this way, the fiber layer 40 is sandwiched by the opposed layer 31 with the insulating dispersion medium 45.

Figure 3:
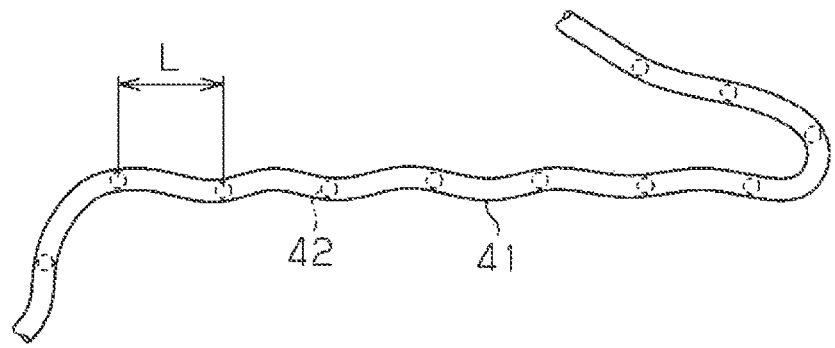
FIG. 3 is a partial enlarged plan view of a fiber according to the embodiment.

As shown in FIG. 3, the fiber 41 is a line material having a sufficiently large length relative to a diameter thereof. In the fiber 41, non-electrophoretic particles 42 are held while being dispersed. The non-electrophoretic particles 42 are particles that are not electrophoresed by an electrical field and have an optical characteristic on which color indicated by the fiber layer 40 depends.

For example, in the case where the non-electrophoretic particles 42 have such a characteristic as to reflect visible light in an entire band, by the reflection of the non-electrophoretic particles 42, the fiber layer 40 indicates white color. Further, for example, in the case where the non-electrophoretic particles 42 have such a characteristic as to reflect visible light except blue, by the reflection of the non-electrophoretic particles 42, the fiber layer 40 indicates yellow. Furthermore, for example, in the case where the non-electrophoretic particles 42 have such a characteristic as to convert visible light into a fluorescent color, by the color conversion of the non-electrophoretic particles 42, the fiber layer 40 indicates the fluorescent color. Furthermore, for example, in the case where the non-electrophoretic particles 42 have such a characteristic that light interferes depending on the structure or arrangement of the non-electrophoretic particles 42, by the interference of light by the non-electrophoretic particles 42, the fiber layer 40 indicates a structural color.

It should be noted that in the case where the non-electrophoretic particles 42 have such an optical characteristic as to reflect light having a predetermined wavelength, it is desirable that the non-electrophoretic particles 42 adjacent to each other are disposed at a shorter interval L than the wavelength of visible light. If a large number of non-electrophoretic particles 42 are disposed at the intervals L, in the fiber layer 40, the non-electrophoretic particles 42 are disposed at an interval equal to or shorter than the interval L. As a result, the interference of light is suppressed between the non-electrophoretic particles 42 adjacent to each other, so the reflection of light by the non-electrophoretic particles 42 is increased, and therefore the intensity of the color indicated by the fiber layer 40 is increased.

The fiber 41 may be a linear line material, a winding line material, or a line material branched into two or more. Out of those configurations, if the fiber 41 is the winding line material, the fibers 41 are complicatedly intertwined, and the internal structure of the fiber layer 40 becomes complicated, with the result that the optical characteristic of the fiber layer 40 is improved. It should be noted that in the fiber 41, the non-electrophoretic particles 42 are buried, so a main line material that forms the fiber 41 may be a resin that allows light to pass therethrough in the dispersion medium 45 or may be a resin that makes up for the optical characteristic of the non-electrophoretic particles 42. That is, the optical characteristic of the fiber layer 40 depends on the non-electrophoretic particles 42, so the main line material in the fiber 41 is selected as appropriate within a range in which the optical characteristic of the non-electrophoretic particles 42 is reflected on the fiber layer 40 itself. Further, in the case where the main line material that forms the fiber 41 has a high responsiveness to the dispersion medium 45, the surface of the main line material that forms the fiber 41 is desirably covered by an additional protection layer. In the case where the main line material that forms the fiber 41 has an optical characteristic on which the color indicated by the fiber layer 40 depends, the non-electrophoretic particles 42 described above may be excluded.

The diameter of the fiber 41 is selected as appropriate in accordance with the size of the electrophoretic particle 44. For example, the diameter of the fiber 41 is set to be small to such an extent that the electrophoretic particle 44 is not exposed from a gap between the fibers 41 stacked by disposing a lower fiber 41 in a gap between the fibers 41. Further, the diameter of the fiber 41 the size of the non-electrophoretic particle 42 and is set to be large to such an extent that the non-electrophoretic particle 42 is buried in the fiber 41. For example, it is desirable that the diameter of the fiber 41 is 0.001 μm to 10 μm (both inclusive). In particular, if a nanofiber, the diameter of which is 0.001 μm to 0.1 μm (both inclusive), and the length of which is 100 times larger than the diameter thereof or more, is the fiber 41, a gap between the fibers 41 is larger, so the electrophoretic particle 44 is easily electrophoresed in such a gap. Further, the internal structure of the fiber 41 becomes complicated, so the optical characteristic of the fiber layer 40 is improved by the structure of the fiber layer 40. It should be noted that the thickness of the fiber 40 is selected as appropriate in accordance with responsiveness and a contrast demanded for a display image of the electrophoretic display apparatus 10, for example, 5 μm to 10 μm.

As a main line material that forms the fiber 41, for example, a resin material such as nylon, polylactate, polyamide, polyimide, polyethylene terephthalate, polyacrylonitrile, polyethylene oxide, polyvinyl carbazole, and polyvinyl chloride is used. It should be noted that it is also possible to use a resin material such as polyurethane, polystyrene, polyvinyl alcohol, polysulfone, polyvinyl pyrrolidone, polyvinylidene fluoride, and poly hexafluoropropylene for the material of the line material in the fiber 41. Further, for the fiber 41, a polymer material such as cellulose acetate, collagen, gelatin, and chitosan can also be used. It should be noted that a copolymer of those resin materials and polymer materials can also be used for the fiber 41. Examples of a method of forming the fiber 41 include an electrostatic spinning method, a phase separation method, a phase inversion method, a melt spinning method, a wet spinning method, a dry spinning method, a gel spinning method, a sol-gel method, a spray coating method, and the like.

The electrophoretic particle 44 is a charged particle that is electrophoresed by an electrical field formed between the pixel electrodes 25 and the transparent electrode 34, and is sufficiently small relative to the gap between the fibers 41 included in the fiber layer 40. The electrophoretic particles 44 may be one kind of charged particles or two or more kinds of charged particles the optical characteristics of which are different from each other. It should be noted that in the case where the electrophoretic display apparatus 10 displays an image with a density difference of the same color or with a brightness difference of the same color, the optical characteristics of the electrophoretic particles 44 may be the same as the non-electrophoretic particles 42.

For the electrophoretic particle 44, as an organic pigment, a polycyclic pigment such as a quinacridone series pigment and a quinophthalone series pigment, an azo series pigment such as β-naphthol series pigment and a pyrazolone series pigment, a daylight fluorescent pigment, or a hollow resin pigment is used, for example. Further, for the electrophoretic particle 44, as an inorganic pigment, a black pigment such as carbon black and bone black, a white pigment such as barium sulfate and a silicon oxide, or an inorganic fluorescent pigment such as a sulfide and silicate is used, for example. Furthermore, for the electrophoretic particle 44, as a dye, an organic dye such as an azo series dye and a phthalocyanine series dye or an organic fluorescent dye such as a diaminostilbene series dye is used, for example. For the electrophoretic particle 44, as a metal material, gold, silver, copper, or the like is used, for example. As a metal oxide, a titanium oxide, a zinc oxide, a zirconium oxide, or the like is used, for example. It should be noted that on a surface of the electrophoretic particle 44, a surfactant treatment or a coupling agent treatment for improving dispersiveness of the electrophoretic particles 44 may be performed.

The dispersion medium 45 is an insulating liquid capable of electrophoresing the electrophoretic particles 44. To increase the mobility of the electrophoretic particles 44 and suppress power necessary for moving the electrophoretic particles 44, it is desirable that the dispersion medium 45 is a liquid having a low viscosity. Further, the dispersion medium 45 may be one kind of liquid or a liquid obtained by mixing two or more kinds of liquids. Furthermore, the dispersion medium 45 may contain at least one of a colorant, a charge control agent, a dispersion stabilizer, a viscosity modifier, and a surfactant. It should be noted that in the case where reflection of light having a predetermined wavelength is provided as the optical characteristic of the fiber 41, it is desirable that the refractive index of the dispersion medium 45 is different from that of the fiber 41 and the non-electrophoretic particle 43 to a large extent.

For the dispersion medium 45, for example, an insulating organic medium such as aliphatic hydrocarbon, aromatic hydrocarbon, halogenated hydrocarbon, and silicone oil is used. More specifically, for the aliphatic hydrocarbon, pentane, hexane, cyclohexane, heptane, octane, nonane, deacne, dodecane, ligroin, solvent naphtha, kerosene, normal paraffin, isoparaffin, or the like is used.

Further, for the aromatic hydrocarbon, benzene, toluene, xylene, alkyl benzene, or the like is used.

Figure 4:
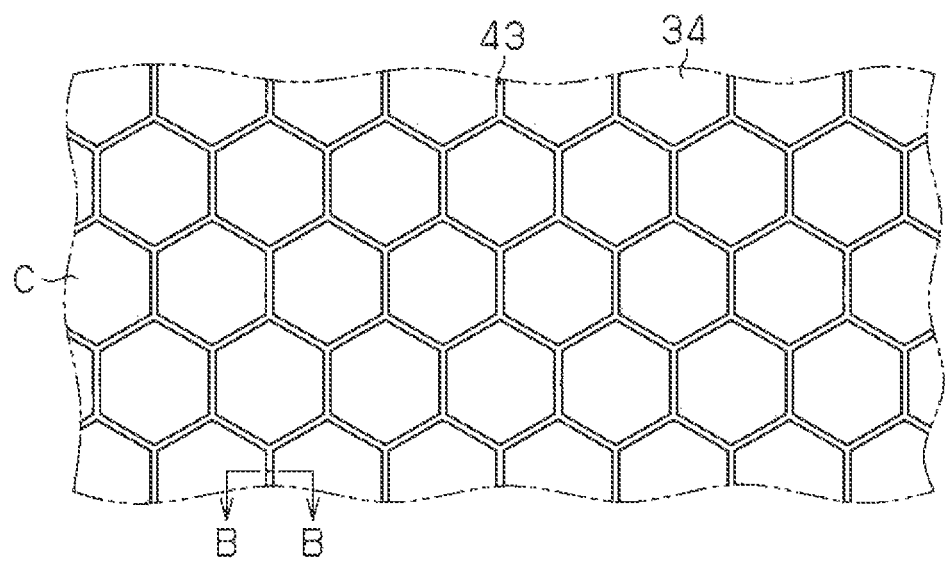
FIG. 4 is a partial enlarged plan view of a partition wall according to the embodiment.

As shown in FIG. 4, the partition wall 43 is a cured resin member (cured body) extended in the thickness direction of the fiber layer 40 and having a hexagonal tubular surface shape, and has so-called a honeycomb structure obtained by arrangement with no gap in the entire translucent layer 32. The partition wall 43 may have a lattice shape. Between the opposed layer 31 and the translucent layer 32, a large number of cells C, each of which is a space surrounded by the partition wall 43 and has a hexagonal tubular shape, are formed. In the cells C, the fibers 41, the electrophoretic particles 44, and the dispersion medium 45 are contained.

The partition wall 43 that fills the gap between the fibers 41 in the thickness direction is formed of a curable resin. Therefore, the resin to be cured which fills the gap between the fibers 41 is cured in the thickness direction of the fiber layer 40, with the result that it is possible to form the partition wall 43 having a complicated shape to fill the gap between the fibers 41. Further, a part of the fiber 41 is buried in the partition wall 43, so the optical characteristic of the fiber 41 works not only in the centers of the cells C but in the boundary between the cells C and the partition wall 43. It should be noted that the partition wall 43 may be made of only the curable resin or may be made of a material equipped with the same optical characteristic as the fiber 41 in addition to the curable resin.

Figure 5:
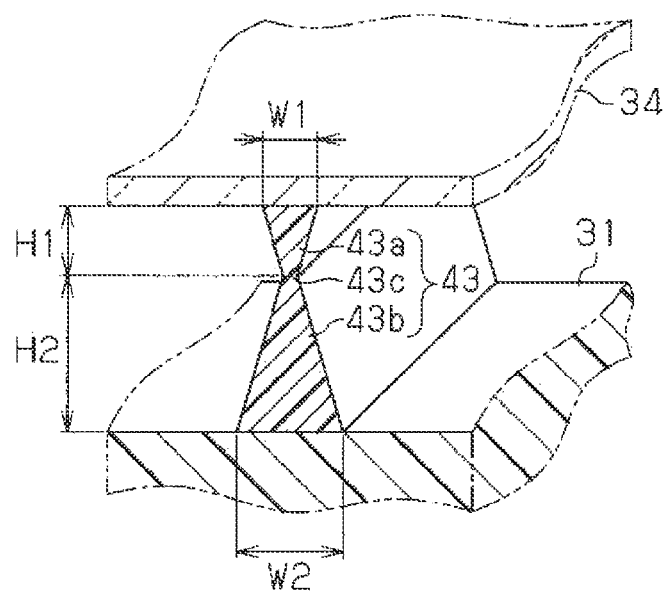
FIG. 5 is a partially fractured perspective view taken along the line B-B of FIG. 4.

As shown in FIG. 5, the partition wall 43 is constituted of a trapezoidal first part 43a which is in contact with the transparent electrode 34 of the translucent layer 32 and is extended along the lower surface of the transparent electrode 34 and a trapezoidal second part 43b which is in contact with the opposed layer 31 and is extended along the upper surface of the opposed layer 31.

The first part 43a is a part which is tapered from the translucent layer 32 toward the opposed layer 31 and the width of which is monotonously decreased from the translucent layer 32 toward the opposed layer 31. On the other hand, the second part 43b is a part which is tapered from the opposed layer 31 toward the translucent layer 32 and the width of which is monotonously decreased from the opposed layer 31 toward the translucent layer 32. Therefore, on a connection part 43c with the first part 43a and the second part 43b, a constriction part of the partition wall 43 is formed. The constriction part is a part of the partition wall 43 between the opposed layer 31 and the transparent electrode 34, and at the part, the width of the partition wall 43 is increased toward the opposed layer 31 and increased toward the translucent layer 32.

In the electrophoretic device 30 that electrophoreses the electrophoretic particles 44 in the gap between the fibers 41 in the fiber layer 40, the width of the partition wall 43 for separating the fiber layer 40 into the plurality of cells C affects a contrast of an image of the electrophoretic device 30 and a contrast of an image of the electrophoretic display apparatus 10 provided with the electrophoretic device 30. The larger the width of the partition wall is, the less the fiber layer 40 contained in the cells C becomes. Therefore, the optical characteristics such as the scatter and refraction of light in the fiber layer 40 are lowered on the display surface. As a result, the contrast on the display surface is lowered.

By uniformly thinning the width of the partition wall 43, it is possible to suppress the contrast from being lowered, but in this case, the mechanical strength necessary for the partition wall 43 may be maintained. In particular, the front surface and the back surface of the fiber layer 40, which are both end portions of the fiber layer 40 in the thickness direction, are parts where an external force is likely to act by stacking the translucent layer 32 and the opposed layer 31, for example. Therefore, the necessary mechanical strength is higher as compared to the inside of the fiber layer 40.

In the electrophoretic device 30, in the partition wall 43, between the both end portions of the fiber layer 40 in the thickness direction, the constriction part is provided. With this structure, it is possible to improve the optical characteristics of the fiber layer 40 in the cells C while maintaining the mechanical strength necessary for the partition wall 43. As a result, it is possible to increase the contrast in the electrophoretic device 30.

Generally, a cured quantity in the curable resin is the largest at a part that directly receives energy necessary for the curing. Along with the transmission of the energy for curing, the cured quantity in the curable resin becomes small. In the structure of the partition wall 43, the connection part 43c is a transmission destination of the energy for the curing. Further, the both end portions in the partition wall 43 in the thickness direction are parts that directly receive the energy for the curing. In other words, to the resin before being cured which fills the gap between the fibers 41, the energy necessary for the curing of the resin is supplied from the both sides in the thickness direction in the fiber layer 40. As a result, even if the density of the fibers 41 is high to such an extent that the curing from one side in the fiber layer 40 in the thickness direction does not reach to the other side in the fiber layer 40 in the thickness direction, it is possible to form the partition wall 43 that penetrates the fiber layer 40. In the case where the optical characteristics of the fiber 41 prevent the energy necessary for the curing of the resin from being transmitted, the effect described above becomes more noticeable.

Here, a thickness from the contact portion between the first part 43a and the transparent electrode 34 to the connection part 43c is set to a first part thickness H1, and a thickness from a contact portion between the second part 43b and the opposed layer 31 to the connection part 43c is set to a second part thickness H2. Further, in a width direction perpendicular to the thickness direction of the fiber layer 40, a width of the contact part between the first part 43a and the transparent electrode 34 is set to a first part width W1, and a width of the contact part between the second part 43b and the opposed layer 31 is set to a second part width W2.

In the above-mentioned structure of the partition wall 43, the first part thickness H1 is thinned than the second part thickness H2, and the first part width W1 is smaller than the second part width W2. In addition, the ration between the first part thickness H1 and the first part width W1 is substantially equal to the ratio between the second part thickness H2 and the second part width W2. Thus, the connection part 43c of the first part 43a and the second part 43b is formed to be closer to the transparent electrode 34 relative to the opposed layer 31 in the thickness direction of the fiber layer 40.

In the first place, the partition wall 43 is used to suppress the electrophoretic particles 44 from moving between the adjacent cells C, so the both end portions in the partition wall 43 in the thickness direction are necessary to be in contact with the opposed layer 31 and the transparent electrode 34. Therefore, if a part of the fiber 41 is included in the partition wall 43, the partition wall 43 having the structure described above impedes the optical operation of the fiber 41, unless the partition wall 43 makes up for the optical characteristics of the fiber 41. For example, the contact part between the first part 43a and the transparent electrode 34 impedes the optical operation of the fiber 41 through the translucent layer 32.

In this point, by the partition wall 43 having the structure described above, a contact area of the partition wall 43 and the transparent electrode 34 naturally becomes smaller than a contact area of the partition wall 43 and the opposed layer 31. Therefore, as compared to the structure in which the first part width W1 is more than the second part width W2, an image of the partition wall 43 which is formed through the translucent layer 32 is smaller. As a result, an image of the electrophoretic particle 44 which is formed through the translucent layer 32 becomes larger.

At the time when the partition wall 43 is formed, one of the opposed layer 31 and the translucent layer 32 supports the partition wall 43. With the partition wall 43 having the structure described above, the contact area between the partition wall 43 and the opposed layer 31 is larger than the contact area with the translucent layer 32 in the partition wall 43. That is, of the opposed layer 31 and the translucent layer, with one where an image of the electrophoretic particle 44 is not formed outside, the contact area of the partition wall 43 becomes large. Therefore, by supporting the partition wall 43 by the opposed layer 31, it is possible to make an image of the electrophoretic particle 44 relatively large and secure the support structure to support the partition wall 43 at the same time.

For the material of the partition wall 43, for example, a light-curable resin which is cured by receiving light having a predetermined wavelength or a thermosetting resin that is hardened by receiving heat is used. Examples of the light-curable resin include a photo crosslinking reaction type, a photo modification type, a photo polymerization reaction type, a photo degradation reaction type, and the like. Further, as the light curable resin, a UV-curable resin such as a UV-curable resin mainly containing an acrylic compound, a UV-curable resin mainly containing a urethane acrylate oligomer, and a vinylphenol-based resin is used. As the thermosetting resin, for example, a phenol resin, an epoxy resin, or an ester resin may be used.

(Operation of Electrophoretic Display Apparatus)

Next, the operation of the electrophoretic display apparatus 10 will be described. It should be noted that, in the explanation of the operation, the fiber 41 has such an optical characteristic as to reflect visible light in an entire band, and the electrophoretic particles 44 have such an optical characteristic as to absorb visible light in the entire band and are charged particles of one kind which are positively charged. A white image is formed through the translucent layer 32 by the fiber layer 40, and a black image is formed through the translucent layer 32 by the electrophoretic particle 44.

In an initial state of the electrophoretic display apparatus, a negative voltage with respect to the transparent electrode 34 is applied to all the pixel electrodes 25. In response to the application of the voltage, all the electrophoretic particles 44 are moved toward the opposed layer 31. The visible light that enters the fiber layer 40 through the translucent layer 32 is reflected by the fibers 41 stacked. As a result, outside the translucent layer 32, a white solid color image is displayed.

From the initial state, when a drive circuit supplies a drive signal to the thin film transistors 23 in accordance with the display image, the pixel electrode 25 is selected through the drive of the thin film transistors 23, and a positive voltage with respect to the transparent electrode 34 is applied to the pixel electrode selected. In response to the application of the voltage, the electrophoretic particles 44 between the pixel electrode 25 selected and the transparent electrode are moved toward the transparent electrode 34. Then, the light that has passed through the translucent layer 32 is absorbed by the electrophoretic particles 44 at such a position to face the pixel electrode 25 selected. As a result, outside the translucent layer 32, a black image corresponding to the arrangement of the pixel electrodes 25 selected is displayed.

(Method of Manufacturing Electrophoretic Device)

Next, a method of manufacturing the electrophoretic device will be described.

Figure 6:
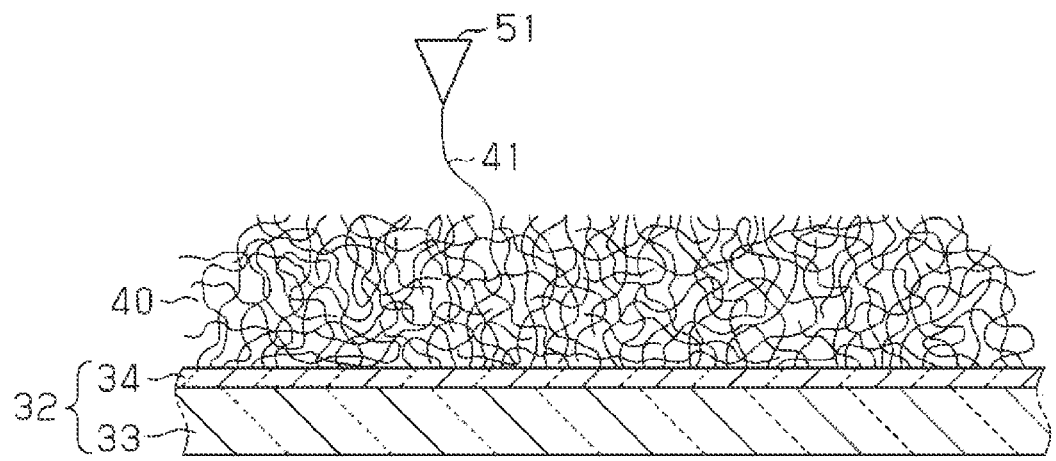
FIG. 6 is a process diagram showing a process for forming a fiber layer in the embodiment.

As shown in FIG. 6, first, the transparent electrode 34 is formed on one entire side surface of the insulating sheet 33. Next, by the electrostatic spinning method that uses a polymer material or resin in which the non-electrophoretic particles 42 are dispersed, the fiber 41 is discharged from a nozzle 51 toward the transparent electrode 34, thereby stacking the fibers 41 on the transparent electrode 34. It should be noted that, as the method of forming the fiber 41, in addition to the electrostatic spinning method, the phase separation method, the phase inversion method, the melt spinning method, the wet spinning method, the dry spinning method, the gel spinning method, the sol-gel method, the spray coating method, or the like is used.

Figure 7:
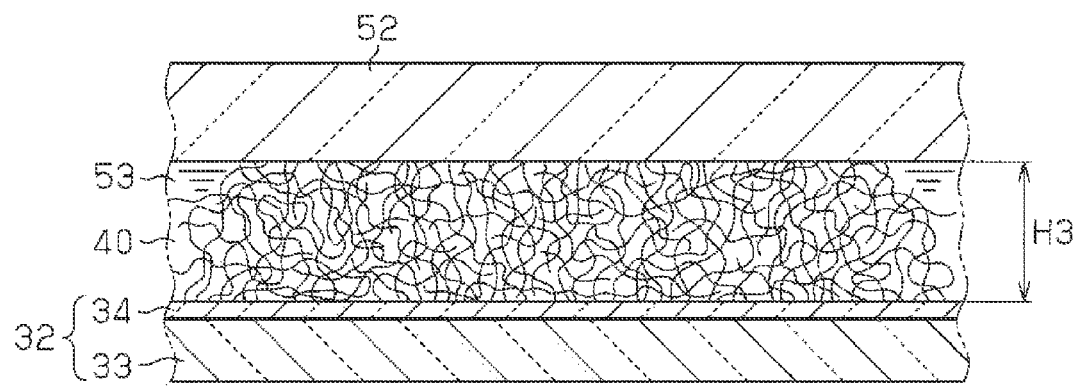
FIG. 7 is a process diagram showing a process for applying a curable resin to the fiber layer in the embodiment.

As shown in FIG. 7, to the fiber 41 stacked on the transparent electrode 34, a liquid curable resin 53 is applied, and the curable resin 53 fills the gap of the fiber 41. It should be noted that at this time, the curable resin 53 applied to the transparent electrode 34 is held on the transparent electrode 34 with a frame-shaped sealing member that surrounds the outer periphery of the insulating sheet 33. After that, a cure-purpose substrate 52 which allows energy for curing the curable resin 53 to pass therethrough is put on the liquid surface of the curable resin 53, and the fiber 41 and the curable resin 53 are sealed between the translucent layer 32 and the cure-purpose substrate 52 with the sealing member. At this time, to the cure-purpose substrate 52, a pressure force is applied to such an extent that a distance H3 between the cure-purpose substrate 52 and the insulating sheet 33 is uniform for the entire cure-purpose substrate 52. By performing sealing with the cure-purpose substrate 52 described above, it is possible to suppress a content of the curable resin 53 that is filled in the fiber layer 40 and the thickness of the fiber layer 40 from varying depending on the electrophoretic devices 30. Further, it is also possible to suppress an inner pressure of the fiber layer 40 in which the curable resin 53 is filled from varying depending on the electrophoretic devices 30.

Figure 8:
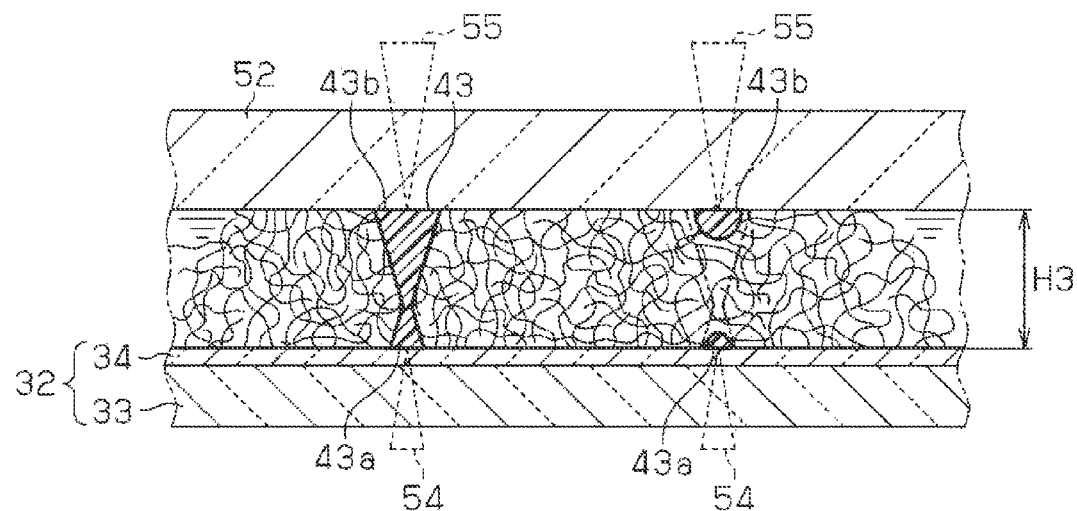
FIG. 8 is a process diagram showing a process for irradiating the curable resin with a UV ray in the embodiment.

As shown in FIG. 8, the energy that cures the curable resin 53 is supplied to the curable resin 53 through both the cure-purpose substrate 52 and the translucent layer 32. It should be noted that, as long as the curing energy that passes through the translucent layer 32 and the curing energy that passes through the cure-purpose substrate 52 may be supplied to parts that face each other at a predetermined time, the energies may be supplied at the same time or at different timings.

For example, in the case here the curable resin 53 is a UV-curable resin, the curing resin 53 is irradiated with a first UV ray 54 that passes through the translucent layer 32, and the curable resin 53 is irradiated with a second UV ray 55 that passes through the cure-purpose substrate 52. At this time, through an optical system in which an interface between the translucent layer 32 and the curable resin 53 serves as a focal plane, the curable resin 53 is irradiated with the first UV ray 54. Further, through an optical system in which an interface between the cure-purpose substrate 52 and the curable resin 53 serves as a focal plane, the curable resin 53 is irradiated with the second UV ray 55. It should be noted that the amount of energy supplied to the curable resin 53 through the translucent layer 32 is smaller than the amount of energy supplied to the curable resin 53 through the cure-purpose substrate 52. For example, the size of a light cross-section formed on the translucent layer 32 by the first UV ray 54 is equal to the size of a light cross-section formed on the cure-purpose substrate 52 by the second UV ray 55, and the intensity of the second UV ray 55 is larger than the intensity of the first UV ray 54.

For the irradiation with the first UV ray 54 and the second UV ray 55, a UV laser for forming a predetermined light cross-section may be used as a light source. Alternatively, for the irradiation with the first UV ray 54 and the second UV ray 55, a mask having an opening for forming the predetermined light cross-section on the translucent layer 32 or the cure-purpose substrate 52 and a UV lamp for irradiating the entire surface of the translucent layer 32 or the cure-purpose substrate 52 with the UV ray may be used. The method of using the UV laser is excellent in making miniaturization of the light cross-section easy, and the method of using the UV lamp or the mask is excellent in making the increase of the area of the light cross-section easy. It should be noted that both the UV laser and the mask may be used.

Then, as shown in the right part of FIG. 8, from a part that receives the energy for the curing, the curing progresses in a direction in which the energy is transmitted at a speed in accordance with the amount of energy. For example, in the curable resin 53 which is irradiated with the first UV ray 54 and the second UV ray 55, from a part that receives the UV ray, the curing progresses in a direction in which the UV ray is transmitted.

At this time, the fiber 41 contained in the curable resin 53 prevents the transmission of the energy for the curing. Therefore, the energy for the curing that is received by the curable resin 53 is gradually weakened toward the center of the fiber layer 40 in the thickness direction. For example, as the first UV ray 54 goes from the translucent layer 32 toward the cure-purpose substrate 52, the light quantity of the first UV ray 54 dispersed in the fiber 41 increases, and as the second UV ray 55 goes from the cure-purpose substrate 52 toward the translucent layer 32, the light quantity of the second UV ray 55 dispersed in the fiber 41 increases. The first UV ray 54 that is received by the curable resin 53 and the second UV ray 55 that is received by the curable resin 53 are gradually weakened toward the center of the fiber layer 40 in the thickness direction. As a result, from the interface between the translucent layer 32 and the curable resin 53, the first part 43a that is tapered toward the cure-purpose substrate 52, and from the interface between the cure-purpose substrate 52 and the curable resin 53, the second part 43b that is tapered toward the translucent layer 32.

As shown in the left part of FIG. 8, in a part where the energy for the curing is relatively weak, the trapezoidal first part 43a which is relatively small is formed, and in a part where the energy for the curing is relatively strong, the trapezoidal second part 43b which is relatively large is formed. As a result, between the both end portions in the fiber layer 40 in the thickness direction, the connection part 43c where the first part 43a and the second part 43b are connected with each other is formed in a position close to the translucent layer 32, for example. The connection part 43c is an example of the constriction part of the partition wall 43.

It should be noted that, as the curable resin 53 to be cured is thicker, the energy necessary for the curing is increased at a geometric rate. In the case where the energy for the curing is supplied from the both surfaces of the fiber layer 40, the amount of energy increased is divided into the translucent layer 32 side with respect to the curable resin 53 and the cure-purpose substrate 52 side with respect to the curable resin 53. Therefore, as compared to the case where the energy for the curing is supplied from only one of the translucent layer 32 and the cure-purpose substrate 52, the amount of energy necessary for curing the curable resin 53 can be suppressed.

Figure 9:
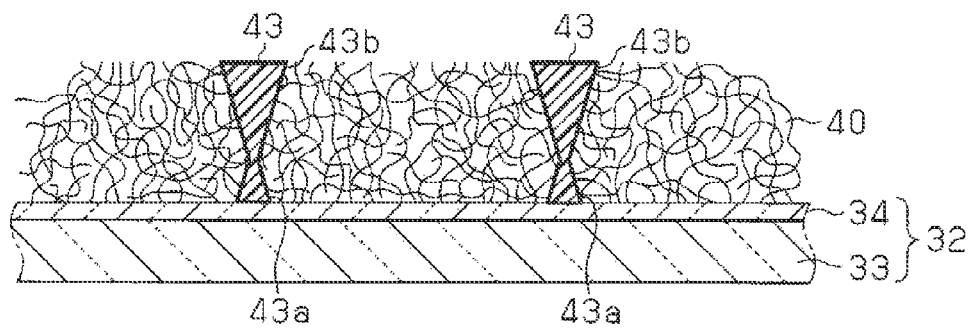
FIG. 9 is a process diagram showing a process for removing the curable resin from the fiber layer in the embodiment.

As shown in FIG. 9, after the energy for the curing is supplied, the curable resin 53 that is not cured is cleaned. That is, after the cure-purpose substrate 52 is removed from the fiber layer 40, the curable resin 53 that is not cured is washed away from the translucent layer 32. At this time, for the washing of the curable resin 53, a detergent solution that dissolves the curable resin 53 and does not dissolve the partition wall 43 and the fiber 41 is used. After the cleaning of the curable resin 53, in the fiber layer 40, the partition wall 43 that penetrates the fiber layer 40 is formed in a direction in which the fiber is stacked. Then, the dispersion medium 45 in which the electrophoretic particles 44 are dispersed is filled in the cells C. After that, in the fiber layer 40, the support member 21 provided with the TFT layer 22 and the opposed layer 31 are laminated. As a result, the electrophoretic display apparatus 10 shown in FIG. 1 is manufactured.

Example

As the transparent electrode 34, an indium tin oxide was used, and the fiber layer 40 having the thickness of 10 μm to 100 μm was formed on the transparent electrode 34. Then, a UV-curable resin was used as the curable resin 53, and the fiber layer 40 was filled with the curable resin 53. Subsequently, a glass substrate was used as the cure-purpose substrate 52, and the cure-purpose substrate 52 was placed on the UV-curable resin.

Further, a UV laser was used as the first UV ray 54, and the UV-curable resin was irradiated with the UV laser through an optical system in which an interface between the transparent electrode 34 and the resin serves as a focal plane. At the same time, a UV laser was used as the second UV ray 55, and a position that faces the position irradiated with the first UV ray 54 was irradiated with the UV laser through an optical system in which an interface between the cure-purpose substrate 52 and the resin serves as a focal plane. At this time, the intensity of the UV laser with which the translucent layer 32 is irradiated was set to be equal to the intensity of the UV laser with which the cure-purpose substrate 52 is irradiated.

Figures 10A, 10B:
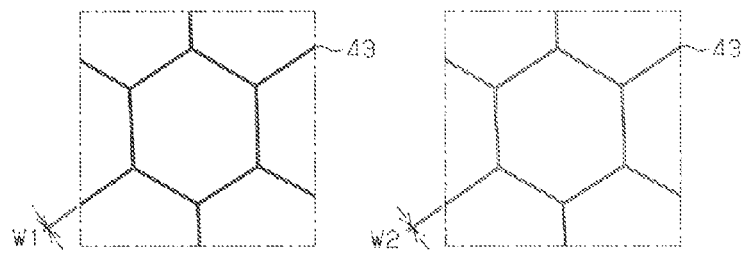
FIGS. 10A and 10B each are a trace of a stereomicroscope photograph showing a partition wall in an example.
Figure 11:
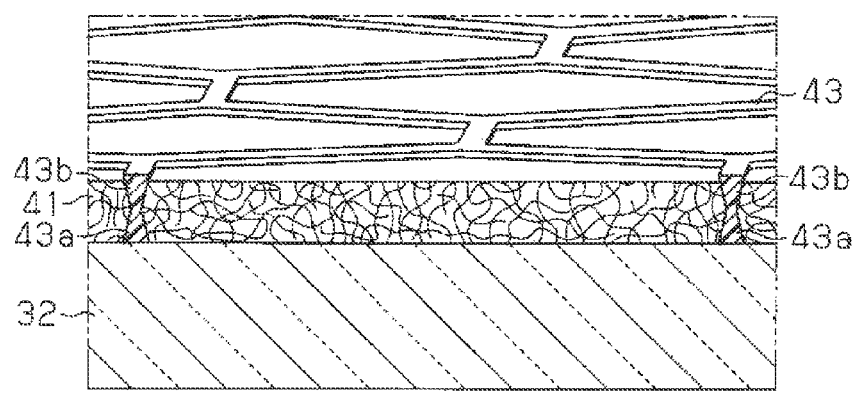
FIG. 11 is a trace of an SEM photograph showing a cross-sectional structure of the partition wall in the example.

FIGS. 10A and 10B each show a plane structure of the partition wall 43 obtained by the UV laser irradiation, and FIG. 11 shows a cross-sectional structure of the partition wall 43. It should be noted that FIG. 10A is a trace of a stereomicroscope photograph showing a plane structure of the partition wall 43 shot through the translucent layer 32, and FIG. 10B is a trace of a stereomicroscope photograph showing a plane structure of the partition wall 43 shot through the cure-purpose substrate 52. Further, FIG. 11 is a trace of an SEM photograph showing a cross-section of the partition wall 43.

As shown in FIG. 10A, the first part width W1 of the partition wall 43 that forms a honeycomb structure was 5 μm to 25 μm. On the other hand, as shown in FIG. 10B, the second part width W2 of the partition wall 43 was 5 μm to 25 μm. It was confirmed that the first part width W1 and the second part width W2 in the partition wall 43 was substantially the same.

As shown in FIG. 11, it was confirmed that in the partition wall 43, the first part 43a tapered toward the center in the fiber layer 40 in the thickness direction and the second part 43b tapered toward the center in the fiber layer 40 in the thickness direction were formed. By irradiating the UV-curable resin with the UV laser from the both sides of the fiber layer 40, it was confirmed that the partition wall that penetrates the fiber layer 40 in the thickness direction thereof and confirmed that the part where the first part 43a and the second part 43b are connected has a constriction shape.

It should be noted that, as another example in which the UV laser is not used, the irradiation with the UV ray was performed in the following process. That is, the transparent electrode was placed on a mask, and the mask was placed on the cure-purpose substrate 52. After that, the entire surface of the transparent electrode 34 was irradiated with the UV ray as the first UV ray 54. At the same time, the entire surface of the cure-purpose substrate 52 was irradiated with the UV ray as the second UV ray. At this time, the intensity of the UV ray with which the translucent layer 32 is irradiated was set to be equal to the intensity of the UV ray with which the cure-purpose substrate 52 was irradiated. According to this example, the result similar to the example in which the UV laser was used was confirmed.

Comparative Example

As in the above example, as the transparent electrode 34, the indium tin oxide was used, and the fiber layer 40 having the thickness of 10 μm to 100 μm was formed on the transparent electrode 34. Then, a UV-curable resin was used as the curable resin 53, and the fiber layer 40 was filled with the curable resin 53. Subsequently, a glass substrate was used as the cure-purpose substrate 52, and the cure-purpose substrate 52 was placed on the UV-curable resin.

Further, the UV-curable resin was irradiated with the UV laser through an optical system in which an interface between the translucent layer 32 and the UV-curable resin serves as a focal plane. At this time, the intensity of the UV laser was set to be equal to the sum of the intensity of the first UV ray 54 and the intensity of the second UV ray 55 in the above example.

Figures 12A, 12B:
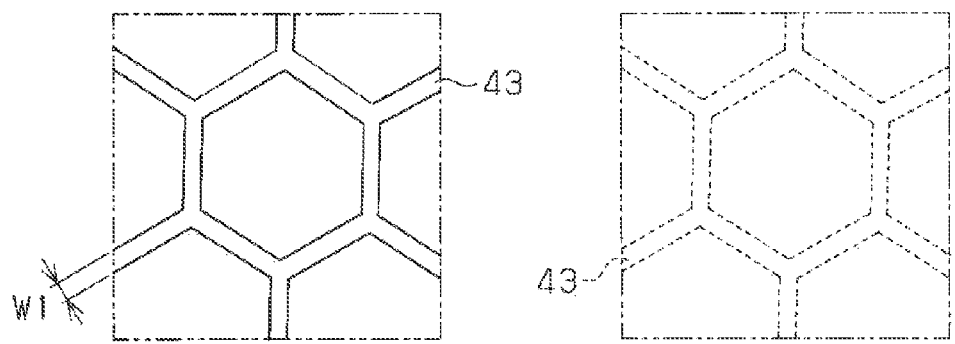
FIGS. 12A and 12B each are a trace of a stereomicroscope photograph showing a partition wall in a comparative example.

FIGS. 12A and 12B each show a plane structure of the partition wall 43 obtained by the irradiation with the UV laser. FIG. 12A is a trace of a stereomicroscopic photograph showing a plane structure of the partition wall 43 shot through the translucent layer 32, and FIG. 12B is a trace of a stereomicroscopic photograph showing a plane structure of the partition wall 43 shot through the cure-purpose substrate 52.

As shown in FIG. 12A, the first part width W1 of the partition wall 43 having the honeycomb structure was 45 μm to 70 μm. On the other hand, as shown in FIG. 12B, the partition wall 43 in contact with the cure-purpose substrate 52 was not confirmed. It was confirmed that the partition wall 43 does not penetrate the fiber layer 40.

It should be noted that, even in the case where only the interface between the translucent layer 32 and the curable resin 53 is irradiated with the UV laser, by increasing the intensity of the UV laser, the partition wall 43 that penetrates the fiber layer 40 in the thickness direction thereof can be formed. Alternatively, even in the case where the entire surface of the translucent layer 32 is irradiated with the UV ray through the mask, by increasing the intensity of the UV ray, the partition wall 43 that penetrates the fiber layer 40 in the thickness direction thereof can be formed.

However, because the first part width W1 of the partition wall in the comparative example is larger than the first part width W1 and the second part width W2 in the example, the width of the partition wall 43 is further increased in the case where the irradiation with the UV ray having the intensity mentioned above is performed. As a result of increasing the contact area with the partition wall 43 in the translucent layer 32, it becomes difficult to visually confirm an image of the electrophoretic particles 44 due to an image of the partition wall 43.

Incidentally, even in the case where only the interface between the cure-purpose substrate 52 and the curable resin 53 is irradiated with the UV laser, by increasing the intensity of the UV laser, the partition wall 43 that penetrates the fiber layer 40 in the thickness direction thereof can be formed. Alternatively, even in the case where the entire surface of the cure-purpose substrate 52 is irradiated with the UV ray through the mask, by increasing the intensity of the UV ray, the partition wall 43 that penetrates the fiber layer 40 in the thickness direction thereof can be formed. However, as a result of increasing the contact area between the opposed layer 31 and the partition wall 43, a voltage applied to the pixel electrodes 25 is difficult to act on the electrophoretic particles 44.

As described above, according to the above embodiment, it is possible to obtain the following effects.

The partition wall 43 formed of the curable resin has the constriction part between the both end parts of the fiber layer 40 in the thickness direction. The shape of the partition wall 43 can be formed by curing the curable resin from the both sides in the thickness direction. For example, even in the case where the density of the fiber 41 in the fiber layer 40 is increased, it is possible to form the partition wall 43 that penetrates the fiber layer 40 in the thickness direction. As a result of improving the optical characteristic of the fiber layer 40, the contrast in the electrophoretic device 30 is increased.

Because the light-curable resin can be used as a material of the partition wall 43, it is possible to make the structure of the partition wall 43 miniaturized or complicated as compared to the case where a thermo-setting resin is used as a material of the partition wall 43.

The connection part 43c of the first part 43a and the second part 43b is formed to be closer to the transparent electrode 34 as compared to the opposed layer 31 in the thickness direction of the fiber layer 40. Therefore, if the curing energy for forming the first part 43a and the curing energy for forming the second part 43b are the same, it is possible to make the first part width W1 smaller than the second part width W2. As a result, it is easy to make the first part width W1 smaller than the second part width W2.

The contact area between the partition wall 43 and the translucent layer 32 is smaller than the contact area between the partition wall 43 and the opposed layer 31. Thus, the image of the partition wall 43 can be difficult to be visually confirmed, and the support structure that supports the partition wall 43 can be ensured.

As compared to the case where the energy for the curing is supplied only to one side surface of the fiber layer 40 in the thickness direction thereof, it is possible to form the partition wall 43 with a smaller amount of energy.

The energy supplied through the translucent layer 32 is dispersed in the fiber 41 as approaching the cure-purpose substrate 52 from the translucent layer 32. Further, the width of the first part 43a is monotonously decreased toward the cure-purpose substrate 52 from the translucent layer 32 in accordance with a change in amount of energy. Thus, it is possible to form the first part 43a without particularly changing the amount of energy supplied through the translucent layer 32 in the process of the supply.

The energy supplied through the cure-purpose substrate 52 is disposed in the fiber 41 as approaching the translucent layer 32 from the cure-purpose substrate 52. Further, the width of the second part 43b is monotonously decreased toward the translucent layer 32 from the cure-purpose substrate 52 in accordance with a change in amount of energy. Thus, it is possible to form the second part 43b without particularly changing the amount of energy supplied through the cure-purpose substrate 52 in the process of the supply.

The interval between the non-electrophoretic particles contained in the fiber 41 is the predetermined interval L shorter than a wavelength of visible light, so it is possible to suppress interference of light between the non-electrophoretic particles 42 adjacent to each other.

The first width W1 of the first part 43a is the largest at the contact part between the first part 43a and the translucent layer 32, and the second width W2 of the second part 43b is the largest at the contact part between the second part 43b and the opposed layer 31. The structures of the first part 43a and the second part 43b can increase adhesion between the partition wall 43 and the translucent layer 32 as compared to the structure in which the constriction part is provided at the contact part between the partition wall 43 and the translucent layer 32. Further, the structures of the first part 43a and the second part 43b can increase adhesion between the partition wall 43 and the opposed layer 31 as compared to the structure in which the constriction part is provided at the contact part between the partition wall 43 and the opposed layer 31.

The first part width W1 of the first part 43a is tapered toward the connection part 43c as the constriction part from the translucent layer 32. Further, the second part width W2 of the second part 43b is tapered toward the connection part 43c as the constriction part from the opposed layer 31. Therefore, the more fiber layer 40 is contained in the cells C as compared to the structure in which the first part width W1 and the second part width W2 are the same width up to substantially the center between the both end portions of the fiber layer 40 in the thickness direction. Thus, the optical characteristics such as the scatter and the refraction of light in the cells C are improved on the display surface, with the result that the contrast on the display surface is increased.

(Modified Examples of Electrophoretic Device)

Hereinafter, modified examples of the electrophoretic device will be described. It should be noted that, in the modified examples of the electrophoretic device, the shape of a partition wall is different from that in the above embodiment. In the following, the shape of the partition wall in the modified examples will be described in detail. It should be noted that in FIGS. 13 to 17, the pixel electrodes are not shown.

Figure 13:
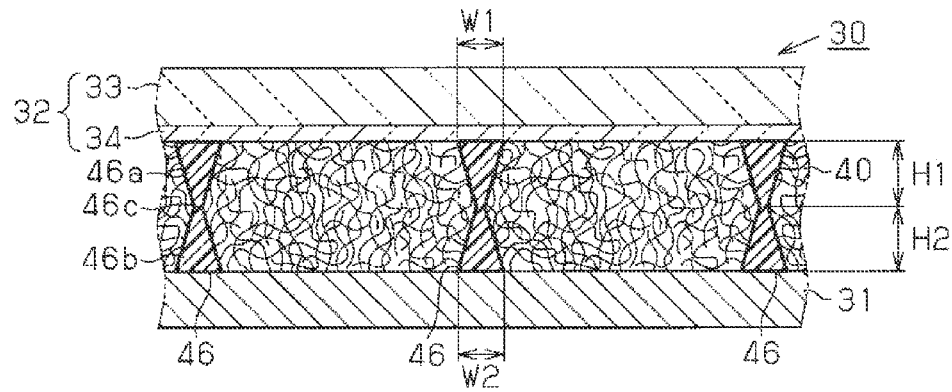
FIG. 13 is a cross-sectional view showing an electrophoretic device in a first modified example of the present disclosure.

In a first modified example, as shown in FIG. 13, a partition wall 46 is constituted of a first part 46a that is tapered from the translucent layer 32 toward the opposed layer 31 and a second part 46b that is tapered from the opposed layer 31 toward the translucent layer 32.

A first part thickness H1 of the first part 46a is substantially the same as a second part thickness H2 of the second part 46b. That is, a connection part 46c of the first part 46a and the second part 46b is formed substantially the center between the both end portions of the partition wall 46 in the thickness direction. The connection part 46c is a constriction part of the partition wall 46.

The first part width W1 of the first part 46a is substantially the same as the second part width W2 of the second part 46b. That is, the contact area of the partition wall 46 and the opposed layer 31 is substantially the same as the contact area of the partition wall 46 and the translucent layer 32. In this way, the first part 46a and the second part 46b of the partition wall 46 are symmetrical with respect to a plane including the connection part 46c in the first modified example.

According to the first modified example, the following effect can be obtained.

The first part 46a and the second part 46b are symmetrical with respect to the plane, so it is possible to make the amount of energy supplied through the translucent layer 32 and the amount of energy supplied through the cure-purpose substrate 52 substantially equal to each other. Thus, it is possible to share the supply source of the energy supplied through the translucent layer 32 and the energy supplied through the cure-purpose substrate 52.

Figure 14:
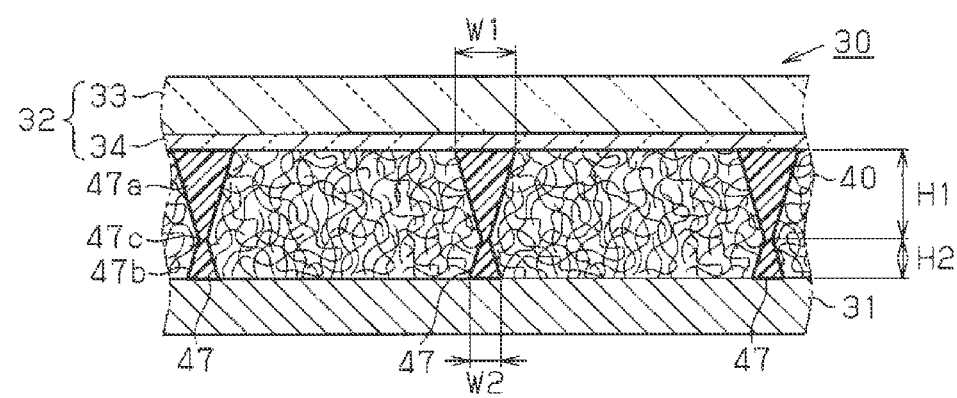
FIG. 14 is a cross-sectional view showing an electrophoretic device in a second modified example of the present disclosure.

In a second modified example, as shown in FIG. 14, a partition wall 47 is constituted of a first part 47a that is tapered from the translucent layer 32 toward the opposed layer 31 and a second part 47b that is tapered from the opposed layer 31 toward the translucent layer 32.

The first part thickness H1 of the first part 47a is larger than the second part thickness H2 of the second part 47b. That is, a connection part 47c of the first part 47a and the second part 47b is formed to be closer to the opposed layer 31 than to the center between the both end portions of the partition wall 47 in the thickness direction. The connection part 47c is a constriction part of the partition wall 47.

The first part width W1 of the first part 47a is larger than the second part width W2 of the second part 47b. That is, the contact area of the partition wall 47 and the translucent layer 32 is larger than the contact area of the partition wall 47 and the opposed layer 31.

According to the second modified example, the following effect can be obtained.

Although the first part width W1 is larger than the second part width W2, the partition wall 47, which is a cured body of the curable resin, has the constriction part between the both end portions in the thickness direction. Therefore, as described above embodiment, it is possible to increase the density of the fiber 41 in the fiber layer 40 and thus improve the optical characteristics. As a result, it is possible to increase the contrast in the electrophoretic device 30.

Figure 15:
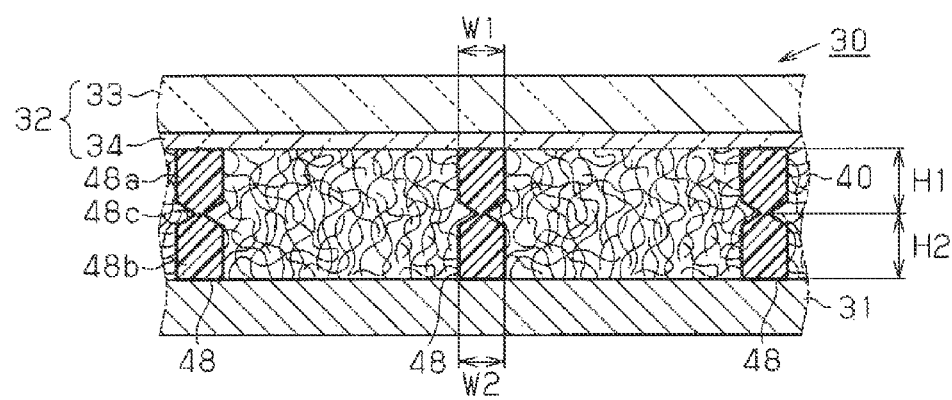
FIG. 15 is a cross-sectional view showing an electrophoretic device in a third modified example of the present disclosure.

In a third modified example, as shown in FIG. 15, a partition wall 48 is constituted of a first part 48a that is extended from the translucent layer 32 toward the opposed layer 31 and a second part 48b that is extended from the opposed layer 31 toward the translucent layer 32.

The first part width W1 of the first part 48a is substantially the same as the second part width W2 of the second part 48b. That is, the contact area of the partition wall 48 and the opposed layer 31 is substantially the same as the contact area of the partition wall 48 and the translucent layer 32. Further, the first part 48a has a pentagonal prism shape that is extended along the lower surface of the translucent layer 32 and has the same width as the first part width W1 up to substantially the center between the both end portions of the fiber layer 40 in the thickness direction. Furthermore, the second part 48b has a pentagonal prism shape that is extended along the upper surface of the opposed layer 31 and has the same width as the second part width W2 up to substantially the center between the both end portions of the fiber layer 40 in the thickness direction. The edge of the first part 48a having the pentagonal prism shape and the edge of the second part 48b having the pentagonal prism shape are connected at substantially the center of the partition wall 48 in the thickness direction. A connection part 48c is a constriction part of the partition wall 48.

The first part 48a and the second part 48b having the structures described above are formed in the following way, for example. First, the intensity of the first UV ray 54 and the intensity of the second UV ray 55 are gradually increased, thereby forming the partition wall having the first part width W1 and the partition wall having the second part width W2 along the thickness direction of the fiber layer 40. After that, the intensity of the first UV ray 54 and the intensity of the second UV ray 55 are abruptly decreased, thereby forming the connection part 48c.

It should be noted that in the third modified example, as in the above embodiment and the second modified example, the part where the first part 48a and the second part 48b are connected with each other may be closer to the opposed layer 31 as compared to the center between the both end portions of the fiber layer 40 in the thickness direction. Alternatively, the part where the first part 48a and the second part 48b are connected with each other may be closer to the translucent layer 32 as compared to the center between the both end portions of the fiber layer 40 in the thickness direction.

According to the third modified example, the following effect can be obtained.

The first part 48a has the same width as the first part width W1 up to substantially the center between the both end portions of the fiber layer 40 in the thickness direction. Further, the second part 48b has the same width as the second part width W2 up to substantially the center between the both end portions of the fiber layer 40 in the thickness direction. Therefore, as compared to the structure in which the width of the first part 48*a* is monotonously decreased from the translucent layer 32 toward the opposed layer 31, it is possible to increase the mechanical rigidity of the partition wall 48. Furthermore, as compared to the structure in which the width of the second part 48*b* is monotonously decreased from the opposed layer 31 toward the translucent layer 32, it is possible to increase the mechanical rigidity of the partition wall 48.

Figure 16:
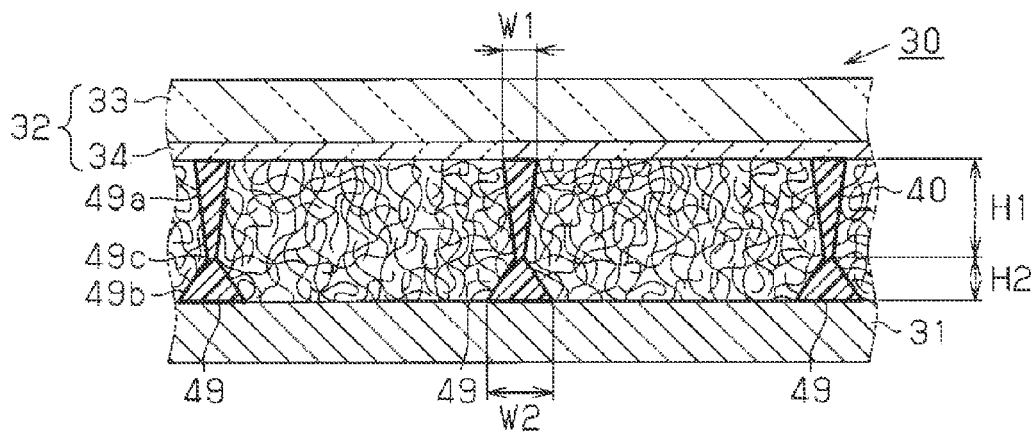
FIG. 16 is a cross-sectional view showing an electrophoretic device in a fourth modified example of the present disclosure.

In a fourth modified example, as shown in FIG. 16, a partition wall 49 is constituted of a first part 49*a* that is tapered from the translucent layer 32 toward the opposed layer 31 and a second part 49*b* that is tapered from the opposed layer 31 toward the translucent layer 32.

The first part thickness H1 of the first part 49*a* is larger than the second part thickness H2 of the second part 49*b*. That is, a connection part 49*c* of the first part 49*a* and the second part 49*b* is formed to be closer to the opposed layer 31 than to the center between the both end portions of the partition wall 49 in the thickness direction. The connection part 49*c* is a constriction part of the partition wall 49.

The first part width W1 of the first part 49*a* is smaller than the second part width W2 of the second part 49*b*. That is, the contact area of the partition wall 49 and the opposed layer 31 is larger than the contact area of the partition wall 49 and the translucent layer 32.

The first part 49*a* and the second part 49*b* having the structures described above are formed in the following way, for example. With the first UV ray 54 having the light cross-section larger than the second UV ray 55, the interface between the translucent layer 32 and the cure-purpose resin 53 is irradiated with a larger intensity than the second UV ray 55. As a result, the first part 49*a* having the first part width W1 smaller than the second part width W2 is formed with the first part thickness H1 larger than the second part thickness H2.

According to the fourth modified example, the following effect can be obtained.

The first part 49*a* having the relatively small width is extended up to the position closer to the opposed layer 31 than to the center of the partition wall 49 in the thickness direction, so the image of the partition wall 49 is less likely to be visually confirmed on the display side.

Figure 17:
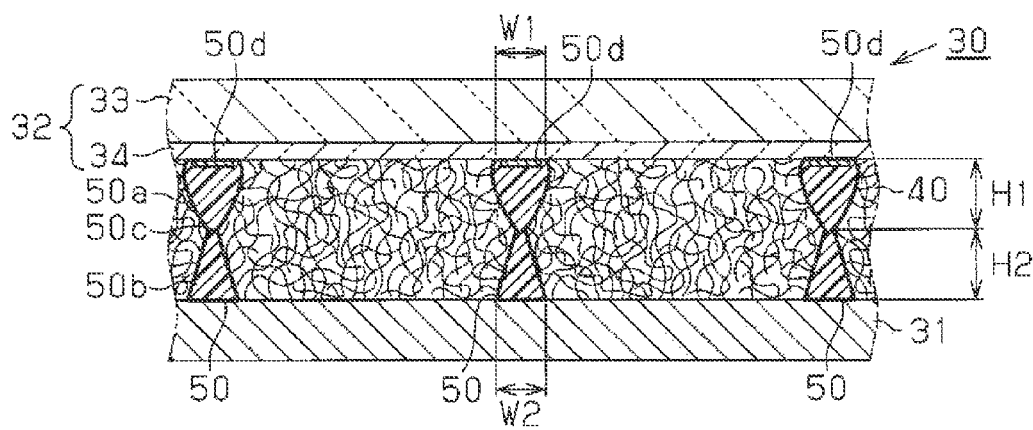
FIG. 17 is a cross-sectional view showing an electrophoretic device in a fifth modified example of the present disclosure.

In a fifth modified example, as shown in FIG. 17, a partition wall 50 is constituted of a first part 50*a* that is extended from the translucent layer 32 toward the opposed layer 31 and a second part 50*b* that is tapered from the opposed layer 31 toward the translucent layer 32.

The first part thickness H1 in the first part 50*a* is substantially the same as the second part thickness H2 in the second part 50*b*, and a connection part 50*a* of the first part 50*a* and the second part 50*b* is formed substantially the center between the both end portions of the partition wall 50 in the thickness direction. Further, the first part width W1 of the first part 50*a* is substantially the same as the second part width W2 of the second part 50*b*.

In the second part 50*b*, the width is monotonously decreased from the opposed layer toward the translucent layer 32. On the other hand, in the first part 50*a*, the width has a maximum value in the thickness direction. That is, in the partition wall 50, a constriction part is formed at an intermediate position of the fiber layer 40 in the thickness direction, and a constriction part is formed also on an interface between the translucent layer 32 and the fiber layer 40.

The first part 50*a* having the structure described above is formed in the following way, for example. On a portion where the partition wall 50 is formed on the lower surface of the transparent electrode 34, a photothermal film 50*d* that converts light into heat is laminated. The photothermal film 50*d* is irradiated with light. At this time, as the curable resin 53, a light curable resin and a thermosetting resin are used, with the result that the curing of the curable resin 53 progresses from a lower end surface of the photothermal film 50*d*, and the curing of the curable resin 53 progresses from a side end surface of the photothermal film 50*d*. Thus, in the partition wall 50, the constriction parts are formed at the intermediate position between the both end portions of the fiber layer 40 in the thickness direction and on the interface between the translucent layer 32 and the fiber layer 40.

According to the fifth modified example, the following effect can be obtained.

Because the curing of the curable resin 53 progresses from the photothermal film 50*d*, it is possible to determine in advance the position where the partition wall 50 is formed with the position of the photothermal film 50*d*. Therefore, even if the position excluding the photothermal film 50*d* is irradiated with light for thermal conversion, it is possible to suppress the partition wall 50 from being formed from the position irradiated. As a result, it is possible to improve the accuracy of the position where the partition wall 50 is formed.

It should be noted that the partition wall may be formed by appropriately combining the first part 43*a* and the second part 43*b* in the above embodiment and the first parts 46*a*, 47*a*, 48*a*, 49*a*, and 50*a* and the second parts 46*b*, 47*b*, 48*b*, 49*b*, and 50*b* in the first to fifth modified examples, respectively.

(Modified Example of Electrophoretic Display Apparatus)

Hereinafter, a modified example of the electrophoretic display apparatus 10 will be described. It should be noted that this modified example is different from the electrophoretic display apparatus 10 in the above embodiment in the structure where the substrate 20 and the electrophoretic device 30 are connected. In the following, the different point will be described in detail.

Figure 18:
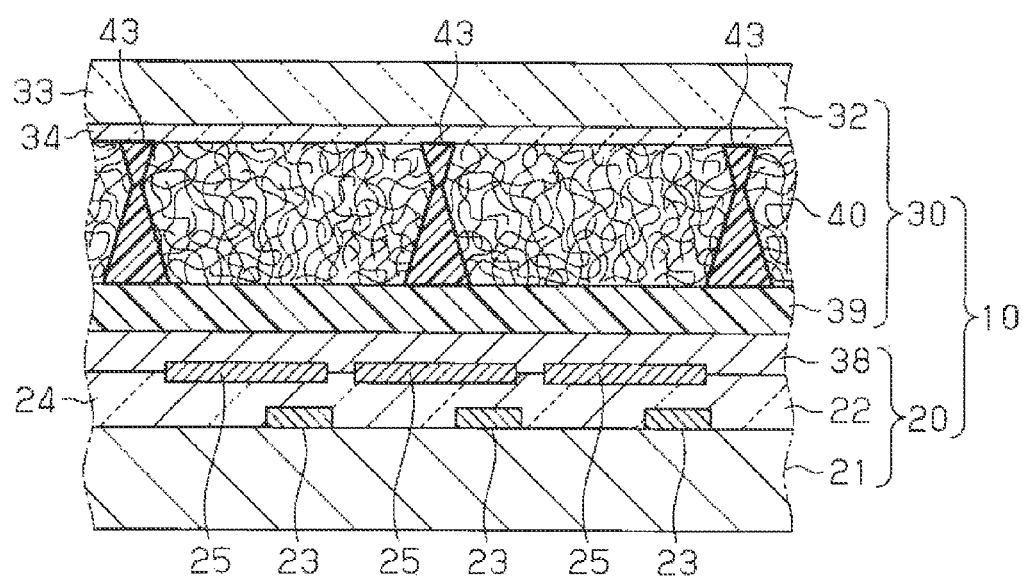
FIG. 18 is a cross-sectional view showing an electrophoretic display apparatus in a modified example of the present disclosure.

As shown in FIG. 18, between the TFT layer 22 and the fiber layer 40, an adhesion layer 38 and an opposed layer 39 are sandwiched. The adhesion layer 38 is a film member that protects the pixel electrodes 25 against a mechanical contact and has an adhesion property with the opposed layer 39, and is bonded to the upper surface of the TFT layer 22. The opposed layer 39 is a film member having a sealing property that seals the electrophoretic particles and the liquid containing the fiber layer 40 in the fiber layer 40, and is bonded to the lower surface of the fiber layer 40. The opposed layer 39 has a permeable property that is permeable by the curing energy described above and may double as the cure-purpose substrate 52.

According to the modified example, the following effect can be obtained.

Because the adhesion layer 38 and the opposed layer 39 are formed of different members, it is possible to handle the electrophoretic device 30 and the substrate 20 separately. Therefore, it is possible to improve the handling performance of the electrophoretic device 30 and the substrate 20 and improve the handling performance of the members in the manufacturing process of the electrophoretic display apparatus 10.

Because the opposed layer 39 doubles as the cure-purpose substrate 52, it is possible to reduce the number of members necessary for manufacturing the electrophoretic devices 30 as compared to the case where the opposed layer 39 and the cure-purpose substrate 52 are separately prepared.

(Electronic Apparatus)

An electronic apparatus provided with the electrophoretic display apparatus 10 described above will be described. It should be noted that the electrophoretic display apparatus 10 can be applied to various use purposes and is not particularly limited. Therefore, in the following, the structure in which the electrophoretic display apparatus 10 is applied to an electronic apparatus provided with a display unit will be described, but the structure is merely an example, and various changes can be made.

Figure 19:
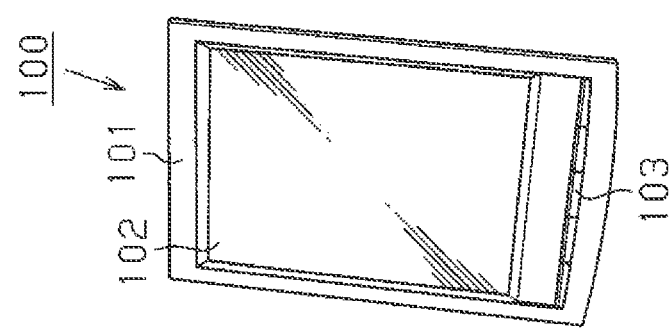
FIG. 19 is a perspective view showing an electronic book terminal as an example of an electronic apparatus in the present disclosure.

As shown in FIG. 19, a casing 101 of an electrical book terminal 100 is equipped with a display unit 102 formed of the electrophoretic display apparatus 10 and operation buttons 103 for operating a display mode on the display unit 102.

Figure 20:
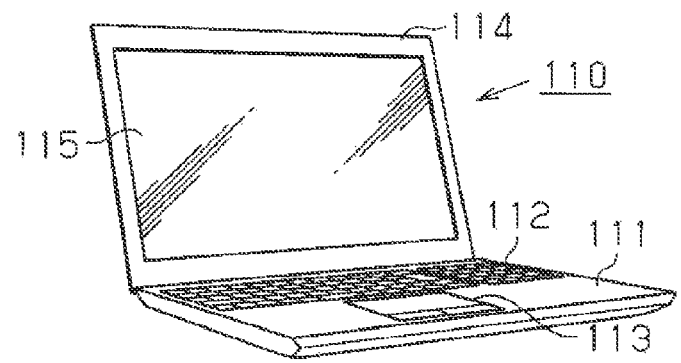
FIG. 20 is a perspective view showing a personal computer as an example of the electronic apparatus in the present disclosure.

As shown in FIG. 20, a lower side casing 111 of a personal computer 110 is equipped with a keyboard 112 and an operation unit 113, an upper side casing 114 of the personal computer 110 is equipped with a display unit 115 formed of the electrophoretic display apparatus 10.

Figure 21:
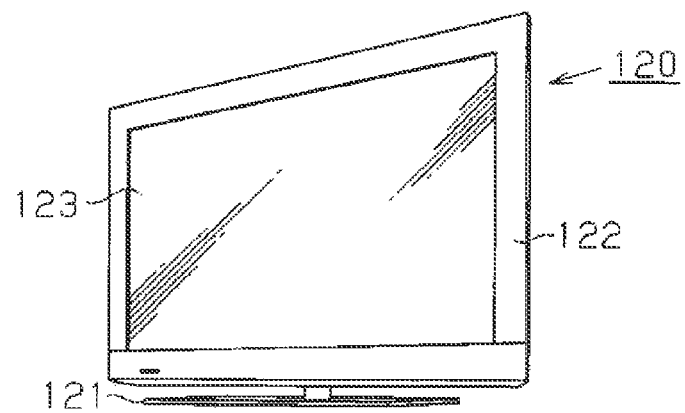
FIG. 21 is a perspective view showing a television as an example of the electronic apparatus in the present disclosure.

As shown in FIG. 21, a casing 122 attached to a support table 121 of a television 120 is equipped with a display unit 123 formed of the electrophoretic display apparatus 10.

Figure 22:
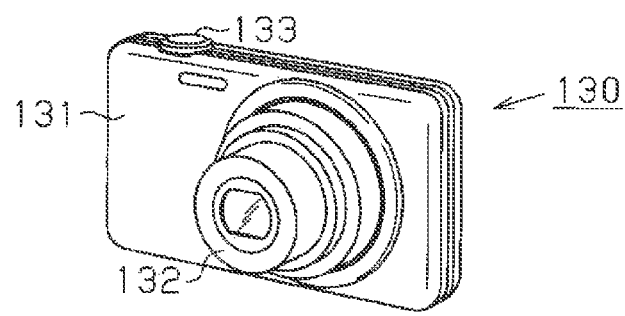
FIG. 22 is a perspective view showing a digital still camera as an example of the electronic apparatus in the present disclosure.
Figure 23:
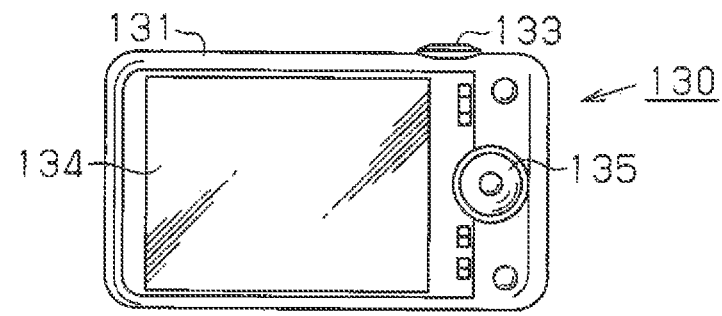
FIG. 23 is a plan view showing the digital still camera as an example of the electronic apparatus in the present disclosure.

As shown in FIG. 22, on one surface of a casing 131 of a digital still camera 130, a lens 132 that takes an image of an image pickup target and an image pickup button 133 for causing the digital still camera 130 to take an image are formed. Further, as shown in FIG. 23, on the other surface of the casing 131, a display unit 134 formed of the electrophoretic display apparatus 10 and an operation button 135 are provided.

Figure 24:
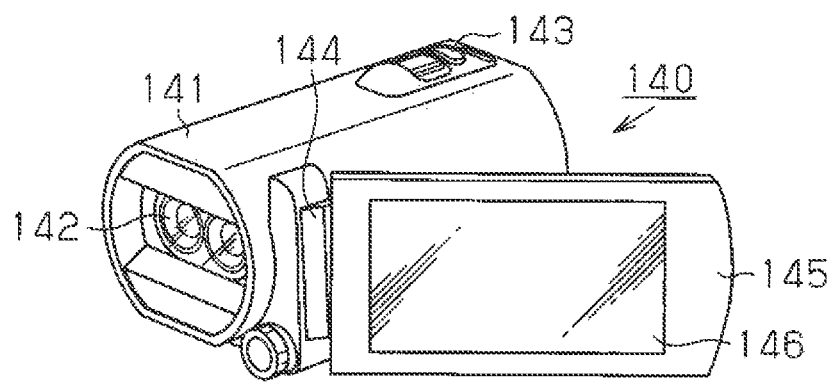
FIG. 24 is a perspective view showing a digital video camera as an example of the electronic apparatus in the present disclosure.

As shown in FIG. 24, a casing 141 of a digital video camera 140 is equipped with a lens 142 and an operation button 143. Further, to the casing 141, a display unit casing 145 is connected through a connection unit 144, and to the display unit casing 145, a display unit 146 formed of the electrophoretic display apparatus 10 is provided.

Figure 25:
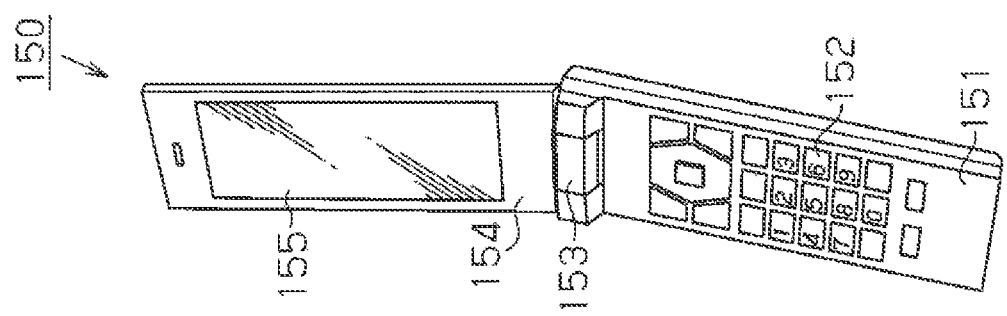
FIG. 25 is a perspective view showing a mobile phone terminal as an example of the electronic apparatus in the present disclosure.
Figure 26:
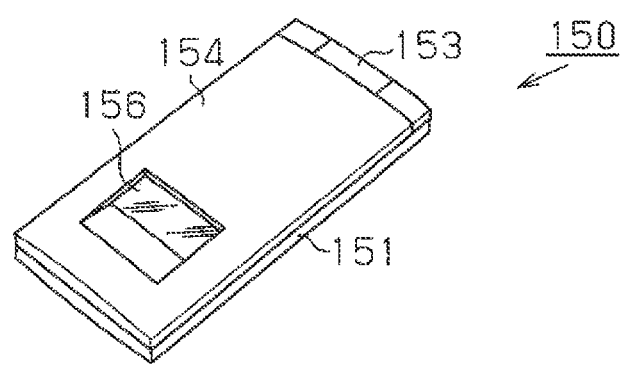
FIG. 26 is a perspective view showing the mobile phone terminal as an example of the electronic apparatus in the present disclosure.

As shown in FIG. 25, a lower side casing 151 provided to a mobile phone terminal 150 is equipped with operation buttons 152, and to the lower side casing 151, an upper side casing 154 is connected through a connection unit 153. To the upper side casing 154, a display unit 155 formed of the electrophoretic display apparatus 10 is provided. Further, as shown in FIG. 26, on a surface opposed to the display unit 155 of the upper side casing 154, a back surface display unit 156 formed of the electrophoretic display apparatus 10 is provided.

It should be noted that the present disclosure can take the following configurations.

(1) An electrophoretic device, including:
a fiber layer;
an electrophoretic particle configured to migrate through a gap in the fiber layer; and
a partition wall extended in a thickness direction of the fiber layer to separate the fiber layer into a plurality of migration cells, the partition wall including a cured body of a curable resin, the cured body including a constriction part between both end portions of the fiber layer in the thickness direction.

(2) The electrophoretic device according to Item (1), further including:
a translucent layer configured to cause light to pass therethrough; and
an opposed layer configured to cause the fiber layer to be sandwiched along with an insulating liquid, in which the constriction part is closer to the translucent layer than to the opposed layer.

(3) The electrophoretic device according to Item (1) or (2), further including:
a translucent layer configured to cause light to pass therethrough; and
an opposed layer configured to cause the fiber layer to be sandwiched along with an insulating liquid, in which a contact area of the partition wall and the translucent layer is smaller than a contact area of the partition wall and the opposed layer.

(4) The electrophoretic device according to any one of Items (1) to (3), further including:
a translucent layer configured to cause light to pass therethrough; and
an opposed layer configured to cause the fiber layer to be sandwiched along with an insulating liquid, in which the partition wall includes
a first part that is tapered from the translucent layer toward the constriction part, and
a second part that is tapered from the opposed layer toward the constriction part.

(5) The electrophoretic device according to any one of Items (1) to (4), in which
the curable resin is a light curable resin.

(6) The electrophoretic device according to any one of Items (1) to (5), in which
the fiber layer is formed of a fiber that is a resin fiber in which non-electrophoretic particles that reflect light are held while being dispersed, and
a distance between the non-electrophoretic particles in the fiber is shorter than a wavelength of visible light.

(7) The electrophoretic device according to any one of Items (1) to (6), in which
the partition wall partitions the fiber layer into the plurality of migration cells, and
the fiber layer is formed of a fiber that includes a part inside the partition wall which is buried in the partition wall and a part outside the partition wall which is positioned in the migration cells.

(8) The electrophoretic device according to any one of Items (1) to (7), in which
the fiber layer is porous.

The present disclosure contains subject matter related to that disclosed in Japanese Priority Patent Application JP 2012-112882 filed in the Japan Patent Office on May 16, 2012, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electrophoretic device, comprising:
a fiber layer comprising a plurality of fibers, wherein the fiber layer is sandwiched between a translucent layer and an opposed layer,
wherein the fiber layer includes a resin fiber which holds a plurality of non-electrophoretic particles that reflect light, wherein the plurality of non-electrophoretic particles are dispersed in the resin fiber, and
wherein a distance between a first non-electrophoretic particle of the plurality of non-electrophoretic particles in the resin fiber and a second non-electrophoretic particle of the plurality of non-electrophoretic particles is shorter than a wavelength of visible light;

an electrophoretic particle configured to migrate through a gap in the fiber layer; and a partition wall of a curable resin, wherein the partition wall extends in a thickness direction of the fiber layer to separate the fiber layer into a plurality of migration cells, wherein the partition wall is in contact with the translucent layer and with the opposed layer, and wherein the partition wall is tapered along the thickness direction of the fiber layer and has a constriction between the translucent layer and the opposed layer.

2. The electrophoretic device according to claim 1,
wherein the translucent layer is configured to pass light,
wherein the opposed layer is configured to sandwich the fiber layer with an insulating liquid, and
wherein the constriction is closer to the translucent layer than the opposed layer.

3. The electrophoretic device according to claim 1,
wherein the translucent layer is configured to pass light,
wherein the opposed layer is configured to sandwich the fiber layer with an insulating liquid, and
wherein a width of a first contact part of the partition wall and the translucent layer is smaller than a width of a second contact part of the partition wall and the opposed layer.

4. The electrophoretic device according to claim 1,
wherein the translucent layer is configured to pass light,
wherein the opposed layer is configured to sandwich the fiber layer with an insulating liquid, and
wherein the partition wall is tapered from the translucent layer toward the constriction and from the opposed layer toward the constriction.

5. The electrophoretic device according to claim 1, wherein the curable resin is a light curable resin.

6. The electrophoretic device according to claim 1, wherein the fiber layer is porous.

7. The electrophoretic device according to claim 1, wherein the partition wall has a honeycomb structure.

8. The electrophoretic device according to claim 1,
wherein the partition wall further includes a material having a first optical characteristic, and wherein the plurality of fibers have the first optical characteristic.

9. The electrophoretic device according to claim 1,
wherein the translucent layer is configured to pass light,
wherein the opposed layer is configured to sandwich the fiber layer with an insulating liquid,
wherein the partition wall is tapered from the translucent layer toward the constriction and from the opposed layer toward the constriction, and
wherein a width of the partition wall is increased toward the translucent layer and the opposed layer from the constriction.

10. The electrophoretic device according to claim 1, wherein a first ratio of a width of a first contact part of the partition wall with the translucent layer and a thickness of the partition wall from the first contact part with the translucent layer to the constriction is equal to a second ratio of a width of a second contact part of the partition wall with the opposed layer and the thickness of the partition wall from the second contact part with the opposed layer to the constriction.

11. An electrophoretic display apparatus, comprising:
a drive device configured to cause an electrophoretic particle to migrate; and
an electrophoretic device including the electrophoretic particle,
wherein the electrophoretic device includes:

a fiber layer comprising a plurality of fibers, wherein the fiber layer is sandwiched between a translucent layer and an opposed layer, wherein the fiber layer includes a resin fiber which holds a plurality of non-electrophoretic particles that reflect light, wherein the plurality of non-electrophoretic particles are dispersed in the resin fiber, and wherein a distance between a first non-electrophoretic particle of the plurality of non-electrophoretic particles in the resin fiber and a second non-electrophoretic particle of the plurality of non-electrophoretic particles is shorter than a wavelength of visible light, the electrophoretic particle configured to migrate through a gap in the fiber layer, and a partition wall of a curable resin, wherein the partition wall extends in a thickness direction of the fiber layer to separate the fiber layer into a plurality of migration cells, wherein the partition wall is in contact with the translucent layer and with the opposed layer, and wherein the partition wall is tapered along the thickness direction of the fiber layer and has a constriction between the translucent layer and the opposed layer.

12. An electronic apparatus, comprising:
a drive device configured to cause an electrophoretic particle to migrate; and
a display unit with an electrophoretic device including the electrophoretic particle,
wherein the electrophoretic device includes:

a fiber layer comprising a plurality of fibers, wherein the fiber layer is sandwiched between a translucent layer and an opposed layer, wherein the fiber layer includes a resin fiber which holds a plurality of non-electrophoretic particles that reflect light, wherein the plurality of non-electrophoretic particles are dispersed in the resin fiber, and wherein a distance between a first non-electrophoretic particle of the plurality of non-electrophoretic particles in the resin fiber and a second non-electrophoretic particle of the plurality of non-electrophoretic particles is shorter than a wavelength of visible light, the electrophoretic particle configured to migrate through a gap in the fiber layer, and a partition wall of a curable resin, wherein the partition wall extends in a thickness direction of the fiber layer to separate the fiber layer into a plurality of migration cells, wherein the partition wall is in contact with the translucent layer and with the opposed layer, and wherein the partition wall is tapered along the thickness direction of the fiber layer and has a constriction between the translucent layer and the opposed layer.

13. A method of manufacturing an electrophoretic device, comprising:

filling a gap in a fiber layer with a curable resin, wherein the fiber layer comprises a plurality of fibers, and wherein the fiber layer is sandwiched between a translucent layer and an opposed layer;

wherein the fiber layer includes a resin fiber which holds a plurality of non-electrophoretic particles that reflect light, wherein the plurality of non-electrophoretic particles are dispersed in the resin fiber, and wherein a distance between a first non-electrophoretic particle of the plurality of non-electrophoretic particles in the resin fiber and a second non-electrophoretic particle of the plurality of non-electrophoretic particles is shorter than a wavelength of visible light, curing the curable resin from both sides of the fiber layer in a thickness direction and forming, in the fiber layer, a partition wall; and causing an electrophoretic particle to be included in the gap in the fiber layer, wherein the partition wall is in contact with the translucent layer and with the opposed layer, and wherein the partition wall is tapered along the thickness direction of the fiber layer and has a constriction between the translucent layer and the opposed layer.

14. The method according to claim 13, wherein the forming of the partition wall includes:

starting the curing of the curable resin from the both sides of the fiber layer in a state in which the curable resin, which is fluid, is filled in the gap in the fiber layer, and ending the curing based on the curing of the curable resin that causes the curable resin from the both sides to be bonded in the fiber layer, thereby forming the partition wall including the constriction.

\* \* \* \* \*